(12) United States Patent
Do et al.

(10) Patent No.: US 7,847,893 B2
(45) Date of Patent: Dec. 7, 2010

(54) DISPLAY DEVICE AND METHOD OF FABRICATING THE SAME

(75) Inventors: Hee-Wook Do, Suwon-si (KR); Yoon-Sung Um, Yongin-si (KR); Dong-Hoon Chung, Suwon-si (KR); Seung-Hoo Yoo, Seongnam-si (KR); Sung-Hwan Hong, Suwon-si (KR); Kang-Woo Kim, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 883 days.

(21) Appl. No.: 11/620,870

(22) Filed: Jan. 8, 2007

(65) Prior Publication Data
US 2007/0165160 A1    Jul. 19, 2007

(30) Foreign Application Priority Data
Jan. 19, 2006    (KR) ...................... 10-2006-0005941

(51) Int. Cl.
*G02F 1/1335* (2006.01)
(52) U.S. Cl. ..................................................... 349/113
(58) Field of Classification Search .......... 349/113–114
See application file for complete search history.

(56) References Cited

U.S. PATENT DOCUMENTS 7,440,055 B2 * 10/2008 Nam et al. .................. 349/114
7,576,816 B2 *  8/2009 Wang ......................... 349/114

FOREIGN PATENT DOCUMENTS

| JP | 2003-050389 | 2/2003 |
| KR | 1020020051455 | 6/2002 |
| KR | 1020030057142 | 7/2003 |

* cited by examiner

*Primary Examiner*—James A Dudek
(74) *Attorney, Agent, or Firm*—F. Chau & Associates, LLC (57) ABSTRACT

A display device includes a gate line and a data line aligned on a substrate, wherein the gate line and the data line cross each other to define a pixel area on the substrate, a gate electrode branching from the gate line, a source electrode branching from the data line on the gate electrode, a drain electrode spaced apart from the source electrode, a reflective electrode extending from the drain electrode, wherein the reflective electrode is formed in the pixel area, and an insulating layer pattern formed on the reflective electrode, wherein a protrusion pattern is provided at a surface of the insulating layer pattern.

17 Claims, 7 Drawing Sheets

DISPLAY DEVICE AND METHOD OF FABRICATING THE SAME

CROSS-REFERENCE TO RELATED APPLICATION

This application claims priority to Korean Patent Application No. 2006-05941filed on Jan. 19, 2006, the contents of which are herein incorporated by reference in their entirety.

BACKGROUND OF THE INVENTION

1. Technical Field

The present disclosure relates to a display device and a method of fabricating the display device, and more particularly, to a reflective display device with improved reflection efficiency and a method of fabricating the reflective display device.

2. Discussion of the Related Art

A flat panel display device, which is a slim display device having a flat display panel, is used as an image display device. A liquid crystal display (LCD) device is one of the flat panel display devices used for, for example, notebook computers or mobile communication terminals.

The LCD device displays images by using the characteristic of liquid crystal, which changes light transmittance depending on an electric field applied to the liquid crystal. That is, the LCD device applies the electric field to the liquid crystal, thereby changing the alignment of liquid crystal molecules in such a manner that light passes through the liquid crystal with light transmittance corresponding to the image to be displayed. Since the liquid crystal does not emit light by itself, light is provided from an exterior or from a separate light emitting device inside the LCD device. The LCD device can be a reflective LCD device, a transmissive LCD) device, or a transflective LCD device according to the type of light sources. The reflective LCD device receives external light, for example, natural light from an exterior. The transmissive LCD device receives internal light, for example, artificial light from a separate light emitting device disposed in the LCD device. The transflective LCD device uses both the external light and the internal light. For example, the transflective LCD device uses the natural light and the artificial light for the external light and internal light, respectively.

The reflective and transflective LCD devices are provided with a reflective electrode, which reflects external light incident into the reflective and transflective LCD devices. The transmissive and transflective LCD devices are provided with a backlight unit that generates the light in the transmissive and transflective LCD devices. The reflective electrode is formed in a pixel area through a photolithography process. However, since the photolithography process is performed to fabricate the reflective electrode, fabrication steps for the LCD device may increase and a separate etch mask is used.

SUMMARY OF THE INVENTION

According to an embodiment of the present invention, a display device includes a gate line and a data line aligned on a substrate, wherein the gate line and data line cross each other to define a pixel area on the substrate, a gate electrode branching from the gate line, a source electrode branching from the data line on the gate electrode, a drain electrode spaced apart from the source electrode, a reflective electrode extending from the drain electrode and being formed in the pixel area, and an insulating layer pattern formed on the reflective electrode, wherein a protrusion pattern is provided at a surface of the insulating layer pattern.

According to an embodiment of the present invention, a method of fabricating a display device includes forming a gate line and a gate electrode branching from the gate line on a substrate, forming a data line crossing the gate line to define a pixel area, forming a source electrode branching from the data line on the gate electrode, forming a drain electrode being spaced apart from the source electrode, forming a reflective electrode extending from the drain electrode into the pixel area and forming an insulating layer pattern aligned on the reflective electrode, wherein a protrusion pattern is formed at a surface of the insulating layer pattern.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

Exemplary embodiments of the present invention will be described in more detail with reference to the accompanying drawings. The present invention may be embodied in many different forms and should not be construed as limited to the embodiments set forth herein.

Figure 1:
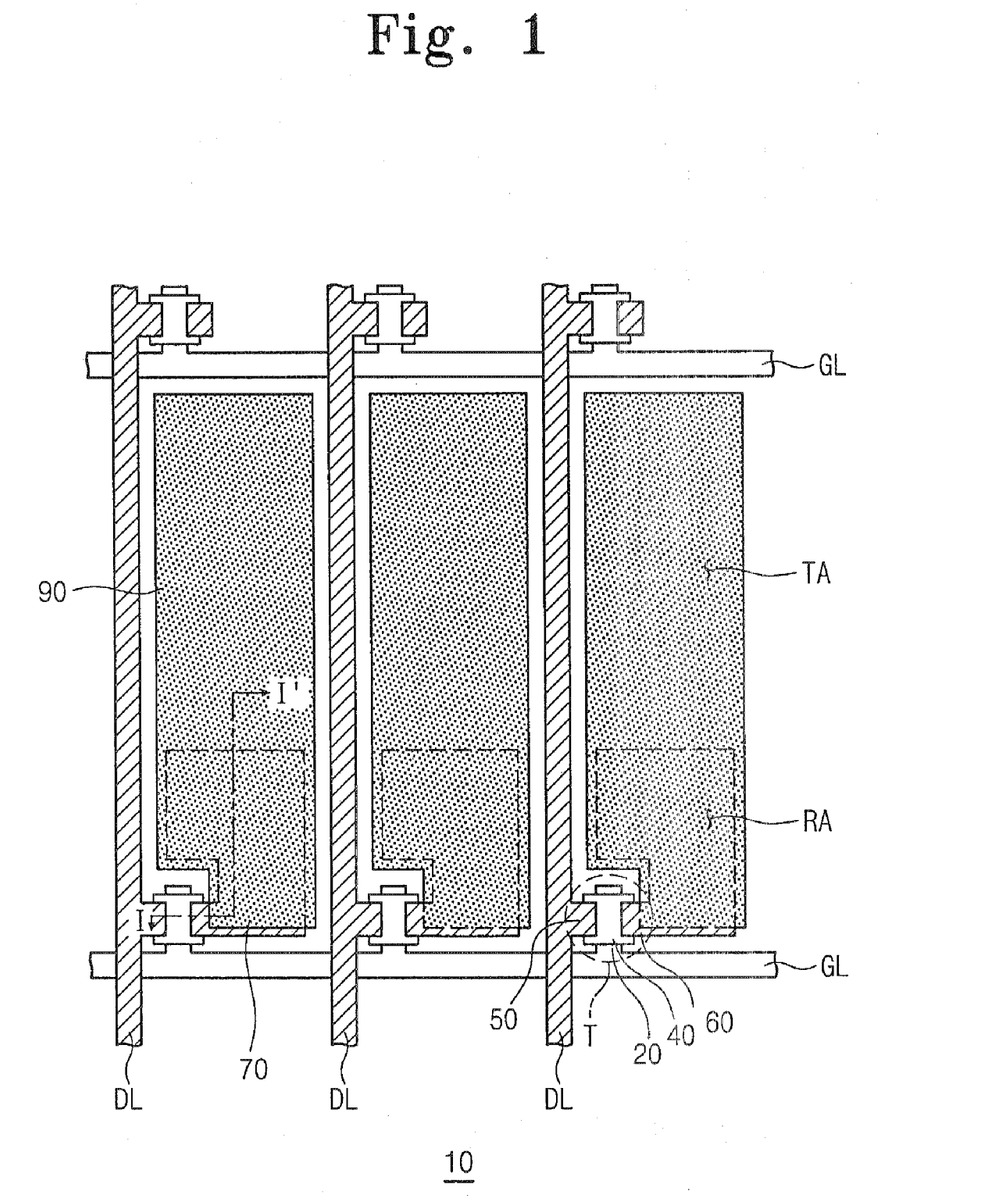
FIG. 1 is a plan view showing an LCD device according to an exemplary embodiment of the present invention.

FIG. 1 is a plan view showing an LCD device according to an exemplary embodiment of the present invention.

The LCD device according to an exemplary embodient of the present invention includes top and bottom substrates, which are coupled with each other, and a liquid crystal layer aligned between the top and bottom substrates. FIG. 1 shows the bottom substrate (hereinafter, the bottom substrate will be referred to as a "substrate" and the top substrate will be referred to as an "opposite substrate").

Referring to FIG. 1, metal lines GL and DL are provided on the substrate 10 in a matrix. The metal lines GL and DL include gate lines GL aligned in the row direction and data lines DL aligned in the column direction. The gate lines GL cross the data lines DL, thereby defining pixel areas therebetween.

A thin film transistor T is provided in each pixel area. The thin film transistor T includes a gate electrode 20 branching from the gate line GL, a semiconductor pattern 40 formed on the gate electrode 20, a source electrode 50 branching from the data line DL, and a drain electrode 60 facing the source electrode 50 while being spaced apart from the source electrode 50. A reflective electrode 70 extending from the drain electrode 60, and a pixel electrode 90 electrically connected to the drain electrode 60 while covering the reflective electrode 70 are formed in the pixel area.

When a gate-on signal is applied to the gate line GL, the thin film transistor T is turned on. When the thin film transistor T is turned on, a data signal corresponding to image information is transferred to the data line DL. The data signal is applied to the pixel electrode 90 through the thin film transistor T. When applying the data signal to the pixel electrode 90, a common voltage is applied to a common electrode which is provided on the opposite substrate such that the common electrode faces the pixel electrode 90. Thus, an electric field generated due to the potential difference between the pixel electrode 90 and the common electrode is applied to the liquid crystal layer. As the electric field is applied to the liquid crystal layer, the alignment of liquid crystal molecules is changed, so that the liquid crystal layer has light transmittance corresponding to the alignment of the liquid crystal molecules.

The reflective electrode 70 is provided on a part of the pixel area such that the pixel area is divided into a reflective area RA and a transmissive area TA using the reflective electrode 70. In the reflective area RA, the reflective electrode 70 reflects light, which is incident into the reflective area RA from the exterior. The reflected light is output by passing through the liquid crystal, so that the image is displayed. The reflective electrode 70 is not provided in the transmissive area TA. Thus, light generated from a separate backlight unit is output by passing through the transmissive area TA of the pixel electrode 90 and the liquid crystal, so that the image is displayed.

The LCD device may operate as the reflective LCD device, if the reflective electrode 70 is formed over the whole region of the pixel area. When the reflective electrode 70 is formed over the entire region of the pixel area, the reflective electrode 70 may function as the pixel electrode 90 if the data voltage is applied to the reflective electrode 70, so the pixel electrode 90 can be omitted.

The reflective electrode 70 extends from the drain electrode 60. That is, the reflective electrode 70 is integrally formed with the drain electrode 60. Thus, according to an exemplary embodiment of the present invention, a separate process of forming the reflective electrode 70 can be omitted.

For instance, forming a conductive layer for the reflective electrode 70, coating a photoresist film to form the reflective electrode 70, forming a photoresist film pattern by exposing and developing the photoresist film, etching the conductive layer using the photoresist film pattern, and stripping the photoresist film pattern can be omitted or substantially simultaneously performed when the drain electrode 60 is formed. A separate photo mask used during the exposure process for the photoresist film can be omitted, so that the number of photo masks can be reduced.

Figure 2:
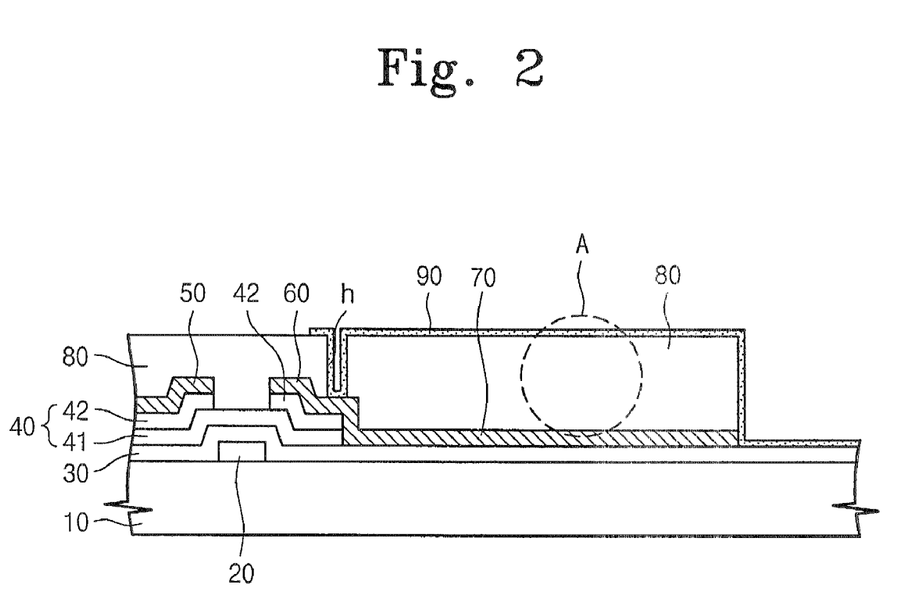
FIG. 2 is a sectional view taken along the line I-I' shown in FIG. 1.

FIG. 2 is a sectional view taken along the line I-I' shown in FIG. 1.

Referring to FIG. 2, the gate electrode 20 is formed on the substrate 10 and a gate insulating layer 30 is formed on the surface of the substrate 10 such that the gate electrode 20 is covered with the gate insulating layer 30. The semiconductor pattern 40 is formed on a region of the gate insulating layer 30 where the gate electrode 20 is formed. The semiconductor pattern 40 includes an active pattern 41 including intrinsic silicon and an ohmic contact pattern 42 including impure silicon formed on the active pattern 41. The ohmic contact pattern 42 is divided into two parts which face each other and on which the source and drain electrodes 50 and 60 are formed. The drain electrode 60 expands into the pixel area, thereby forming the reflective electrode 70. The reflective electrode 70 is covered with an insulating layer pattern 80 on which the pixel electrode 90 is formed.

The insulating layer pattern 80 is formed with a contact hole (h) at predetermined a region corresponding to the drain electrode 60 and is electrically connected to the pixel electrode 90 through the contact hole (h). The insulating layer pattern 80 overlaps the reflective electrode 70 to improve the reflection efficiency of the reflective electrode 70. The reflection efficiency of the reflection electrode 70 can be improved due to a protrusion pattern 81 (see, FIG. 3A) formed on the surface of the insulating layer pattern 80. According to an exemplary embodiment of the present invention, the insulating layer pattern 80 can also be formed on a region where the reflective electrode 70 is not formed.

Figure 3A:
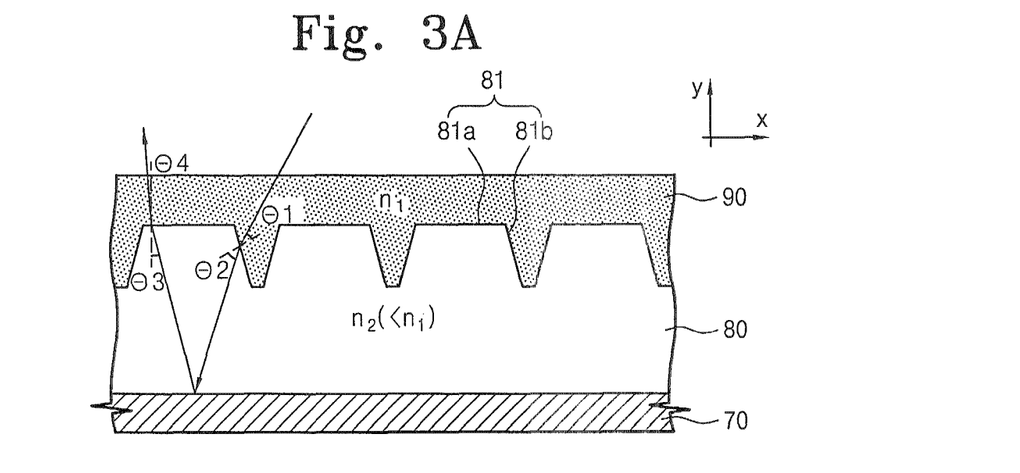
FIGS. 3A to 3C are enlarged views showing the area "A" in FIG. 2 according to exemplary embodiments of the present invention.
Figure 3B:
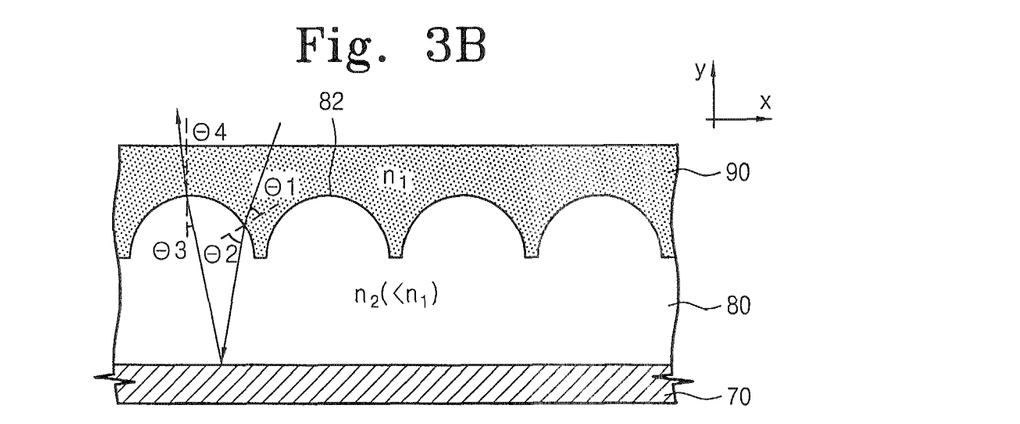
Figure 3C:
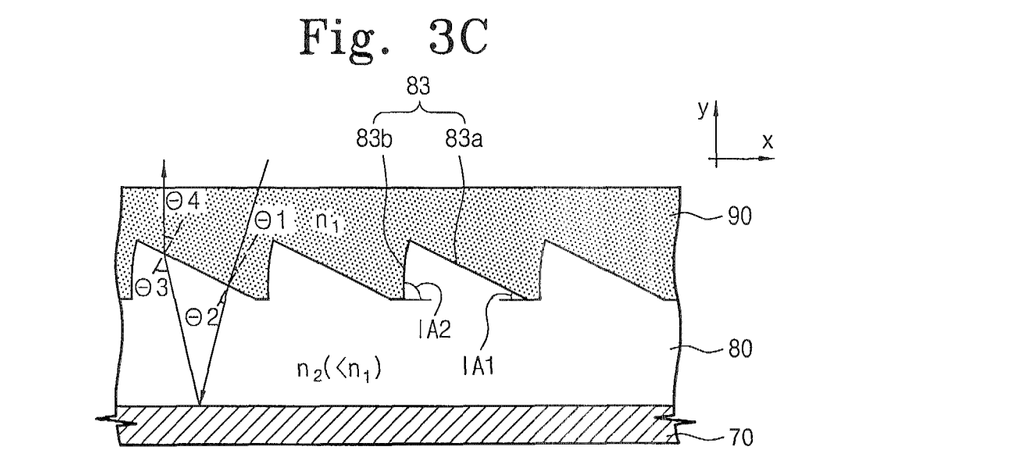

FIGS. 3A to 3C are enlarged views of the "A" part shown in FIG. 2 according to exemplary embodiments of the present invention. A horizontal direction refers to an x-axis direction and a vertical direction refers to a y-axis direction. A "front direction" refers to a (+)y-axis direction, and a "side direction" refers to a direction which is slightly tilted from the horizontal direction.

Referring to FIG. 3A, a plurality of protrusion patterns 81 are symmetric to each other with respect to the vertical direction. Each protrusion pattern 81 includes a flat section 81a extending in the horizontal direction, and sidewall sections 81b which are inclined from the flat section 81a. Arrows shown in FIGS. 3A, 3B and 3C represent the traveling direction of light. Since the image is viewed from the front of the LCD device, if the LCD device is operated in the reflective mode, light incident into the LCD device in the side direction is output in the front direction.

The protrusion pattern 81 according to an exemplary embodiment of the present invention causes the light, which is incident into the LCD device in the side direction, to be output in the front direction.

The refractive index of a specific medium is expressed as a ratio of the light velocity in the specific medium to the light velocity in a vacuum. As the refractive index increases, the light velocity in the medium becomes decreased, and the light travels along a route that shortens the traveling time in the medium. The light is refracted at a boundary between different mediums, so that the route of light is changed.

A case where the light is incident into the medium with an inclination angle is described with reference to FIG. 3A. As shown in FIG. 3A, the light is incident into the insulating layer pattern 80 through the pixel electrode 90. At this time, the light is refracted due to the different refractive index between the pixel electrode 90 and the insulating layer pattern 80. The pixel electrode 90 includes, for example, indium tin oxide or indium zinc oxide. The pixel electrode 90 can have a refractive index of about 1.8 to about 1.9. The insulating layer pattern 80 includes an organic insulating layer having a photoresist characteristic. The insulating layer pattern 80 may have a refractive index of about 1.5.

When the refractive index of the pixel electrode 90 is $n_1$, an angle formed between the traveling direction of light in the pixel electrode 90 and the normal line (shown in dotted lines) of the sidewall section 81b is $\theta_1$, the refractive index of the insulating layer pattern 80 is $n_2$, and an angle formed between the traveling direction of light in the insulating layer pattern 80 and the normal line of the sidewall section 81b is $\theta_2$, the following equation is established.

$$\sin \theta_2 = \sin \theta_1 \times (n_1/n_2)$$

Herein, since $n_1 > n_2$, $\sin \theta_2$ is larger than $\sin \theta_1$. Therefore, as shown in FIG. 3A, even if the incident light is slightly tilted, the light is refracted at the sidewall section 81b in the direction that approximates to the front direction, Then, the light refracted at the sidewall section 81b is reflected from the reflective electrode 70 having a higher reflectance. The light traveling direction before being reflected from the reflective electrode 70 is symmetrical to the light traveling direction after being reflected from the reflective electrode 70.

The reflected light is refracted at the flat section 81a and then is output to the exterior. At this time, refraction of the light at the flat section 81a is identical to refraction of light at the sidewall section 81b, so the following equation is established.

$$\sin \theta_4 = \sin \theta_3 \times (n_2/n_1)$$

Herein, $\theta_3$ is an angle formed between the traveling direction of light in the insulating layer pattern 80 and the normal line of the flat section 81a, and $\theta_4$ is an angle formed between the traveling direction of light in the pixel electrode 90 and the normal line of the flat section 81a. Since $n_1 > n_2$, $\sin \theta_3$ is larger than $\sin \theta_4$. Therefore, the light refracted at the flat section 81a may approximate to the front direction.

In an exemplary embodiment of the present invention, an obtuse angle is formed between the flat section 81a and the sidewall section 81b. Thus, even if the incident light is slightly tilted in the side direction, the light is refracted two times at the sidewall section 81b and the flat section 81a, so that the light can be output in the direction that approximates to the front direction.

The height of the insulating layer pattern 80 is about 2 µm to about 5 µm, and the height of the protrusion pattern 81 is about 0.5 µm to about 3 µm. In an exemplary embodiment of the present invention, a cell gap referring to a width of a liquid crystal layer is changed depending on the height of the insulating layer pattern 80. The cell gap may affect the operational characteristics of the LCD device, such as the response speed of liquid crystal or the brightness of the LCD device, so the height of the insulating layer pattern 80 can be determined based on the response speed of liquid crystal and the brightness of the LCD device. The height of the protrusion pattern 81 is related to the size of the sidewall section 81b. The amount of light refracted in the front direction may vary depending on the size of the sidewall section 81b, and the height of the protrusion pattern 81 is determined to maximize the light that can be output in the front direction.

FIG. 3B shows protrusion patterns 82 that protrude upwardly and have a semi-circular structure according to an exemplary embodiment of the present invention. In the protrusion pattern 82, a region adjacent to the upper surface of the protrusion pattern 82 may function as the flat section 81a. A side section of the protrusion pattern 82 may function as the sidewall section 81b. Therefore, as shown in FIG. 3B, the light incident in the side direction is refracted so that the light can be output in the front direction.

FIG. 3C shows asymmetric protrusion patterns 83 according to an exemplary embodiment of the present invention. Referring to FIG. 3C, the protrusion pattern 83 includes a first sidewall section 83a, which forms a first inside angle IA1 with respect to the line parallel to the reflective electrode 70, and a second sidewall section 83b, which forms a second inside angle IA2 with respect to the line parallel to the reflective electrode 70. The second inside angle IA2 is larger than the first inside angle IA1, and the second sidewall section 83b is smaller than the first sidewall section 83a. Therefore, when the incident light is divided into a first light which is tilted in the direction of the normal line of the first sidewall section 83a and a second light which is tilted in the direction of the normal line of the second sidewall section 83b, the amount of the first light being reflected is greater than that of the second light being reflected. Therefore, as shown in FIG. 3C, the light incident in the side direction is refracted so that the light can be output in the front direction.

When the LCD device is operated in the reflective mode by using external light, such as natural light, the external light may be uniformly incident in all directions of the LCD device. However, when the light can be incident only in one direction of the LCD device, the second sidewall section 83b as shown in FIG. 3C is formed corresponding to the direction through which the light is incident, thereby improving the reflection efficiency in the front direction.

Figure 4:
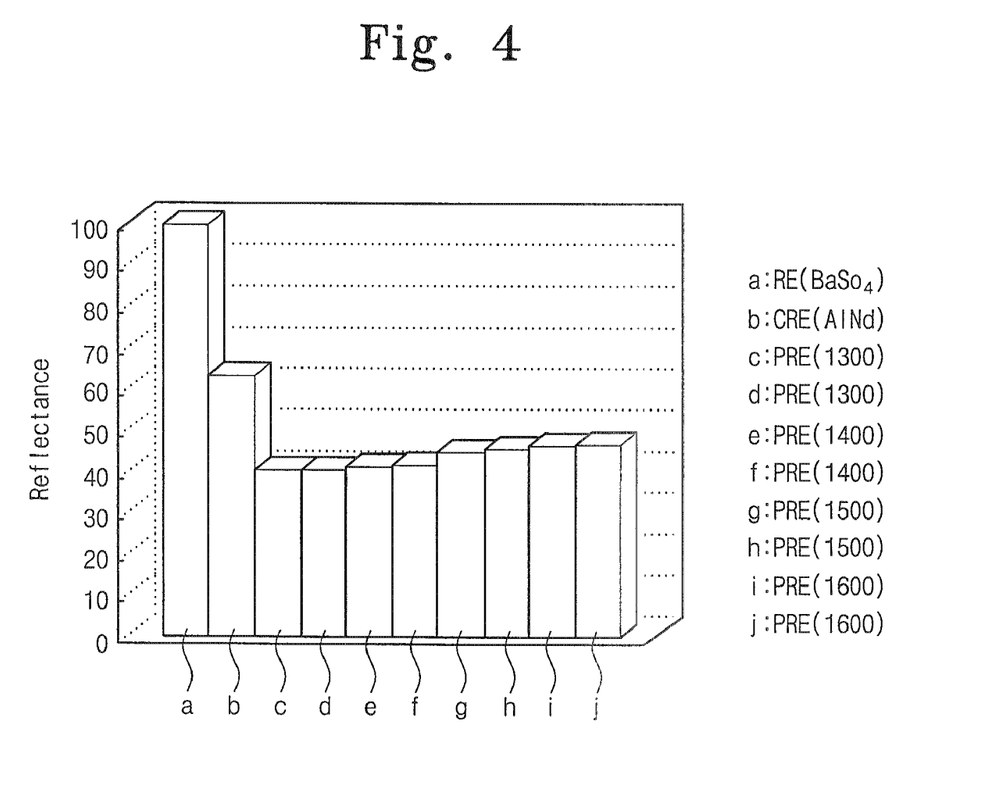
FIG. 4 is a graph showing reflectance of an LCD device according to an exemplary embodiment of the present invention.

FIG. 4 is a graph showing reflectance of an LCD device according to an exemplary embodiment of the present invention. The graph is obtained by using an LCD device having the protrusion pattern as shown in FIG. 3B.

In FIG. 4, a y-axis represents reflectance and an x-axis represents various LCD devices. The reflectance of the LCD devices is relative reflectance obtained on the assumption that a reflective electrode RE (reference electrode) including $BaSO_4$ has reflectance of 100%. Here, the conventional LCD devices refer to the LCD devices having reflective electrodes formed separately from drain electrodes. In the conventional LCD devices using conventional reflective electrodes CRE, the reflectance is about 63%. The LCD device according to an exemplary embodiment of the present invention, which uses the reflective electrode PRE including AlNd and being integrally formed with the drain electrode, represents the reflectance of 40.2% to 45.8%. The reflectance of the LCD device according to an exemplary embodiment of the present invention is about 73% with respect to the reflectance of the conventional LCD device.

In the graph shown in FIG. 4, numbers (1300, 1400, 1500 and 1600) represent exposure time measured in a unit of 1/10000 second. The reflectance increases proportionally with the exposure time.

Figure 5A:
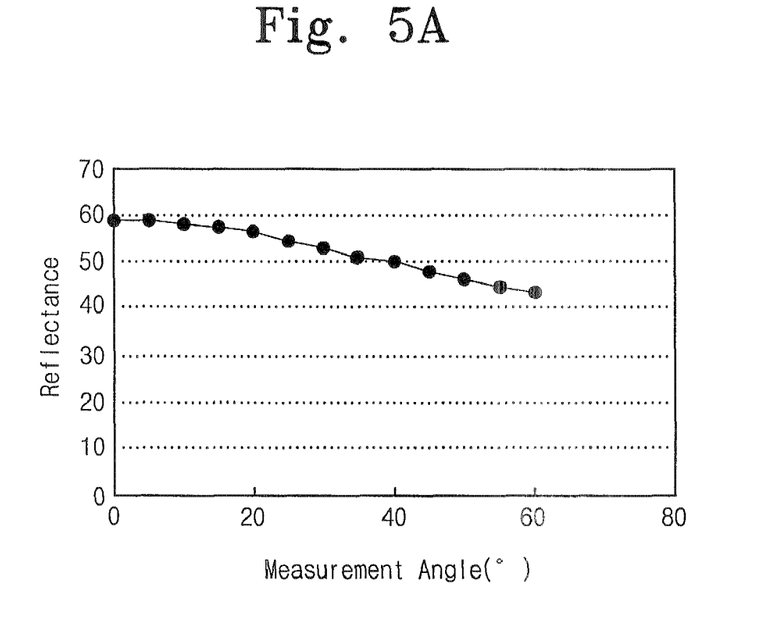
FIG. 5A is a graph illustrating reflectance in relation to measurement angles in a conventional LCD device.
Figure 5B:
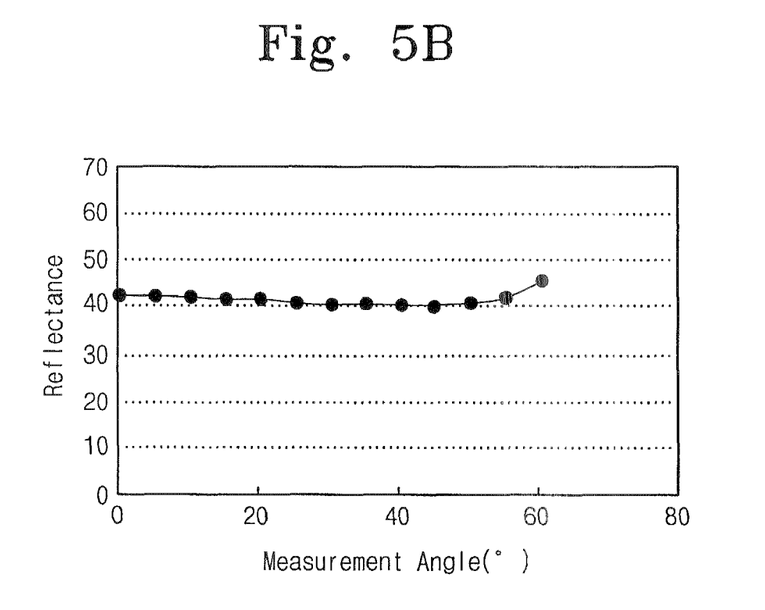
FIG. 5B is a graph illustrating reflectance in relation to measurement angles in an LCD device according to an exemplary embodiment of the present invention.

FIG. 5A is a graph illustrating reflectance in relation to measurement angles in a conventional LCD device. FIG. 5B is a graph illustrating reflectance in relation to measurement angles in an LCD device according to an embodiment described in connection with FIG. 3B.

When measuring the reflectance, a detection device is used to detect and measure the reflected light. The detection device measures the reflectance of the LCD device at various angles while moving from the front portion to the side portion of the LCD device. In FIGS. 5A and 5B, an x-axis represents a measurement angle of the detection device, in which the measurement position of the detection device is shifted from the front portion to the side portion of the LCD device as the measurement angle is changed from 0° to 90°. Similar to FIG. 4, a y-axis represents the relative reflectance of the LCD device obtained on the basis of the reflectance of the reference reflective electrode.

Referring to FIG. 5A, the reflectance is changed from about 60% to about 40% when the measurement angle increases as the measurement position is shifted from the front portion to the side portion of the LCD device. Referring to FIG. 5B, the reflectance is changed from about 40% to about 50% when the measurement angle increases as the measurement position is shifted from the front portion to the side portion of the LCD device. Accordingly, the conventional LCD exhibits degraded image quality in the side direction as compared with the front direction. However, the LCD according to an embodiment of the present invention exhibits uniform image quality in the side and front directions.

FIGS. 6A to 6E are sectional views illustrating a method of fabricating an LCD device according to an exemplary embodiment of the present invention. The method can be applicable for the LCD devices having protrusion patterns shown in FIG. 3A, 3B or 3C.

Figure 6A:
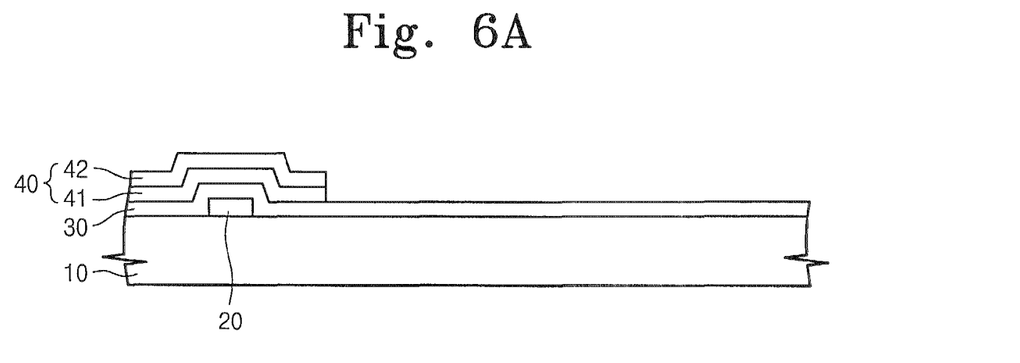
FIGS. 6A to 6E are sectional views for illustrating a method of fabricating an LCD device according to an exemplary embodiment of the present invention.

Referring to FIG. 6A, after a conductive layer is formed on the surface of the substrate 10, the conductive layer is patterned so that the gate electrode 20 is formed. Then, the gate insulating layer 30 and a semiconductor layer are formed on the surface of the substrate 10, and the semiconductor layer formed on the gate electrode 20 is patterned. The semiconductor layer has a dual structure including a lower intrinsic silicon layer and an upper impure silicon layer, which are patterned into the active pattern 41 and the ohmic contact pattern 42, respectively.

Figure 6B:
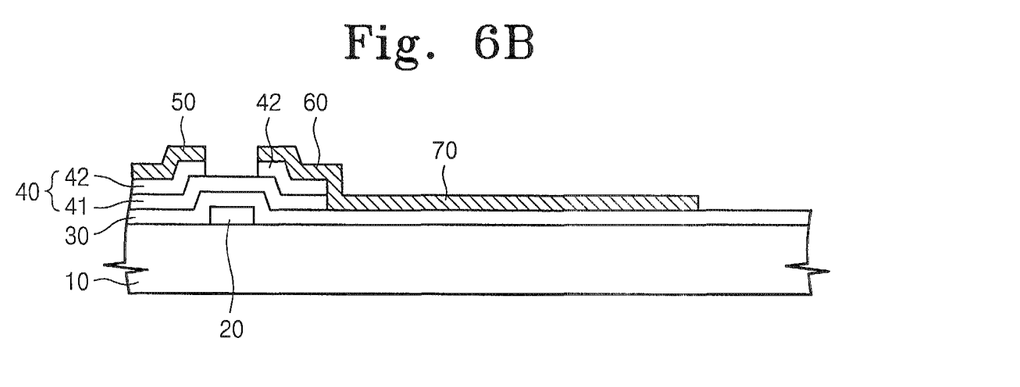

Referring to FIG. 6B, after a conductive layer is formed on the surface of the substrate 10, the conductive layer is patterned so that the source electrode 50, the drain electrode 60 and the reflective electrode 70 are formed. The ohmic contact pattern 42, which is an upper layer of the semiconductor pattern 40, is divided into two parts corresponding to the source electrode 50 and the drain electrode 60. As a result, a thin film transistor including the gate electrode 20, the semiconductor pattern 40, the source electrode 50, and the drain electrode 60 can be obtained.

The reflective electrode 70 includes aluminum (Al) or an aluminum alloy such as, for instance, AlNd.

Figure 6C:
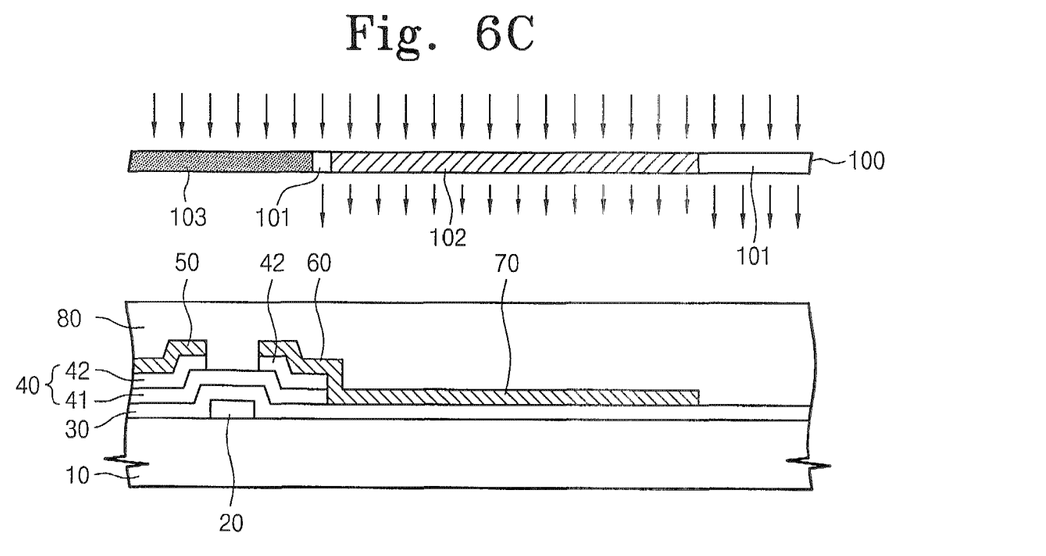

Referring to FIG. 6C, an insulating layer 80' is formed on the surface of the substrate 10. The insulating layer 80' includes an organic layer having a photoresist characteristic. To protect a thin film transistor formed on the active pattern 41, an inorganic protective layer comprising, for example, a silicon nitride layer can be formed below the organic layer.

Then, the exposure process is performed with respect to the insulating layer 80' by using, for example, a photo mask 100, which is designed such that the photo mask 100 can guide the light onto the insulating layer 80' while varying the amount of light exposure depending on the regions of the insulating layer 80'. In an exemplary embodiment of the present invention, the photo mask 100 includes a slit mask having slits spaced apart from each other to adjust the amount of light exposure, or a halftone mask including materials having light transmittance different from each other. The photo mask 100 can be divided into a transmissive area 101, a semi-transmissive area 102 and a non-transmissive area 103, which are aligned according to a corresponding pattern shape of the insulating layer 80'.

Figure 6D:
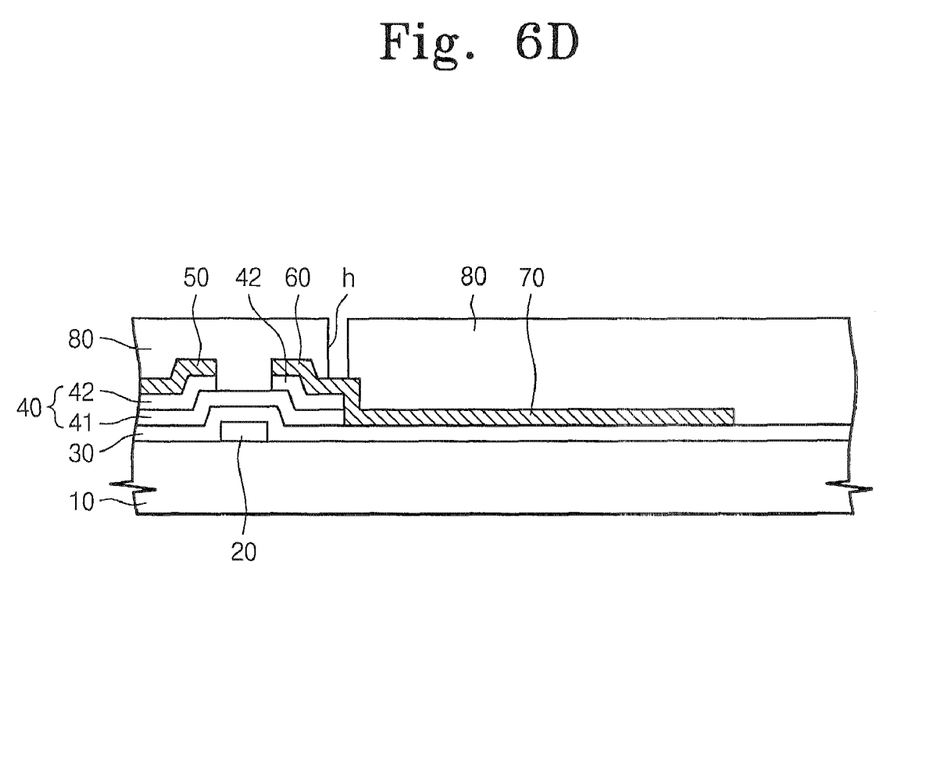

Referring to FIG. 6D, after the exposure process, the insulating layer 80' is developed, thereby forming the insulating layer pattern 80. In the case of a positive type insulating layer, a portion of the insulating layer 80', which corresponds to the non-transmissive area 103, may remain on the thin film transistor. The protrusion patterns 82 (see, FIG. 3B) having the semi-circular shape are formed on a portion of the insulating layer 80', which corresponds to the semi-transmissive area 102, by adjusting the amount of light exposure. For instance, to form the protrusion patterns 82 having the semi-circular shape, a first amount of light is irradiated onto portions of the insulating layer 80' to form convex sections of the protrusion patterns 82 and a second amount of light is irradiated onto portions of the insulating layer 80' to form concave sections of the protrusion patterns 82. The second amount of light is greater than the first amount of light. A portion of the insulating layer 80', which corresponds to the transmissive area 101, is removed. A contact hole (h) exposing a part of the drain electrode 60 is formed by removing a portion of the insulating layer 80'. The insulating layer 80' located at a region, where the reflective electrode 70 is not formed, is also removed.

Figure 6E:
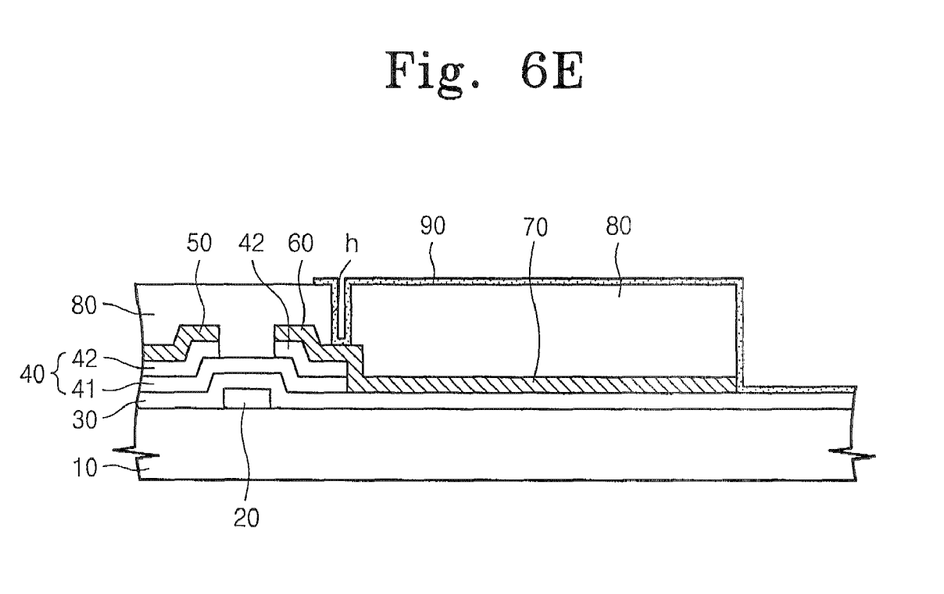

Referring to FIG. 6E, after a transparent conductive layer is deposited on the surface of the substrate 10, the transparent conductive layer is patterned, thereby forming the pixel electrode 90. During the deposition process for the transparent conductive layer, the contact hole (h) is filled with the transparent conducive layer. As a result, the pixel electrode 90 is electrically connected to the drain electrode 60. In an exemplary embodiment of the present invention, when the transparent conductive layer is deposited, the transparent conductive layer can be patterned corresponding to the shape of the insulating layer pattern 80. Thus, the surface of the pixel electrode 90 can also be patterned in, for example, a curved shape.

The pixel electrode 90 covers the reflective electrode 70 and can be formed on a region of the pixel area where the reflective electrode 710 is not formed. The LCD device may operate under the reflective mode at an overlap region between the pixel electrode 90 and the reflective electrode 70 and may operate under the transmissive mode at a region where the pixel electrode 90 is exclusively formed.

According to an exemplary embodiment of the present invention, the LCD device includes the insulating layer pattern provided on the reflective electrode and formed with the protrusion patterns, and the light incident in the side direction is refracted toward the front direction through the protrusion patterns, so that the reflection efficiency can be improved at the front of the LCD device.

According to an exemplary embodiment of the present invention, the reflective electrode is integrally formed with the drain electrode of the thin film transistor and extends from the drain electrode, so that the process of forming the reflective electrode can be omitted.

Although exemplary embodiments of the present invention have been described, it is to be understood that the present invention is not limited to these precise embodiments but various changes and modifications can be made by one ordinary skilled in the art within the spirit and scope of the present invention. All such changes and modifications are intended to be included within the scope of the present invention as defined by the appended claims.

What is claimed is:

1. A display device comprising:
   a gate line disposed on a substrate;
   a gate insulating layer disposed on the gate line and the substrate;
   a data line disposed on the gate insulating layer and crossing the gate line;
   a thin film transistor having a gate electrode branching from the gate line, a source electrode branching from the data line, and a drain electrode on the gate insulating layer spaced apart from the source electrode;
   a reflective electrode extending from the drain electrode and disposed on the gate insulating layer;
   an insulating layer disposed on the reflective electrode and the thin film transistor, a protrusion pattern being provided at an upper surface of the insulating layer; and
   a pixel electrode electrically connected to the drain electrode, a portion of the pixel electrode being disposed on the insulating layer and another portion of the pixel electrode being disposed directly on the gate insulating layer.

2. The display device of claim 1, wherein the pixel electrode is patterned according to a shape of the protrusion pattern.

3. The display device of claim 1, wherein the pixel electrode has a refractive index higher than a refractive index of the insulating layer.

4. The display device of claim 1, wherein the protrusion pattern is symmetrically formed with respect to a direction vertical to the reflective electrode.

5. The display device of claim 4, wherein the protrusion pattern includes a flat section and sidewall sections inclined with respect to the reflective electrode and an obtuse angle is formed between the flat section and a sidewall section.

6. The display device of claim 4, wherein the protrusion pattern protrudes upwardly while forming a convex curve.

7. The display device of claim 1, wherein the protrusion pattern is asymmetrically formed with respect to a direction vertical to the reflective electrode.

8. The display device of claim 7, wherein the protrusion pattern includes a first sidewall section forming a first interior angle with respect to a line parallel to the reflective electrode, and a second sidewall section forming a second interior angle with respect to a line parallel to the reflective electrode, wherein the second interior angle is larger than the first interior angle.

9. The display device of claim 1, wherein the insulating layer has a height from about 2 μm to about 5 μm, and the protrusion pattern has a height from about 0.5 μm to about 3 μm.

10. A method of fabricating a display device, the method comprising:
   forming a gate line and a gate electrode branching from the gate line on a substrate;
   forming a gate insulating layer on the gate line, the gate electrode and the substrate;
   forming a data line crossing the gate line, a source, electrode branching from the data line, a drain electrode being spaced apart from the source electrode, and a reflective electrode extending from the drain electrode;
   forming an insulating layer on the drain electrode and the reflective electrode, a protrusion pattern being formed at an upper surface of the insulating layer; and
   forming a pixel electrode electrically connected to the drain electrode, a portion of the pixel electrode being disposed on the insulating layer and another portion of the pixel electrode being disposed directly on the gate insulating layer.

11. The method of claim 10, wherein the protrusion pattern is symmetrically formed with respect to a direction vertical to the reflective electrode.

12. The method of claim 11, wherein the protrusion pattern includes a flat section and sidewall sections inclined with respect to the reflective electrode and an obtuse angle is formed between the flat section and a sidewall section.

13. The method of claim 11, wherein the protrusion pattern protrudes upwardly while forming a convex curve.

14. The method of claim 10, wherein the protrusion pattern is asymmetrically formed with respect to a direction vertical to the reflective electrode.

15. The method of claim 14, wherein the protrusion pattern includes a first sidewall section forming a first interior angle with respect to a line parallel to the reflective electrode, and a second sidewall section forming a second interior angle with respect to a line parallel to the reflective electrode, wherein the second interior angle is larger than the first interior angle.

16. The method of claim 10, wherein the data line, the source electrode, the drain electrode and the reflective electrode are formed at a same process.

17. The display device of claim 1, wherein the data line, the source electrode, the drain electrode and the reflective electrode include a same material.

* * * * *